(12) United States Patent
Liao

(10) Patent No.: US 11,644,047 B2
(45) Date of Patent: May 9, 2023

(54) WALL FAN SUSPENSION STRUCTURE

(71) Applicant: Chi-Lun Liao, Taichung (TW)

(72) Inventor: Chi-Lun Liao, Taichung (TW)

(*) Notice: Subject to any disclaimer, the term of this patent is extended or adjusted under 35 U.S.C. 154(b) by 87 days.

(21) Appl. No.: 17/363,002

(22) Filed: Jun. 30, 2021

(65) Prior Publication Data
US 2023/0003234 A1 Jan. 5, 2023

(51) Int. Cl.
*F16M 13/00* (2006.01)
*F04D 29/60* (2006.01)
*H02G 3/22* (2006.01)

(52) U.S. Cl.
CPC ............. *F04D 29/601* (2013.01); *H02G 3/22* (2013.01)

(58) Field of Classification Search
None
See application file for complete search history.

(56) References Cited

U.S. PATENT DOCUMENTS

| | | | |
|---|---|---|---|
| 6,199,808 B1* | 3/2001 | Lin | A47K 10/10 211/105 |
| 9,845,811 B1 | 12/2017 | Wang | |
| 11,499,570 B2* | 11/2022 | Jones | F21V 21/03 |
| 2012/0052722 A1* | 3/2012 | Smith | H01R 13/625 439/529 |
| 2012/0178288 A1* | 7/2012 | Smith | H02G 3/16 439/537 |
| 2012/0220163 A1* | 8/2012 | Smith | H01R 13/625 439/529 |
| 2021/0115932 A1* | 4/2021 | Matthews | F04D 29/601 |

* cited by examiner

*Primary Examiner* — Steven M Marsh
(74) *Attorney, Agent, or Firm* — Bruce Stone LLP; Joseph A. Bruce

(57) ABSTRACT

A wall fan suspension structure comprises a wall-side coupling element with a first bottom plate part and a first side plate part connected to each other, the first bottom plate part extends from the first side plate part, and the first bottom plate part is provided for locking on a wall surface; and a fan-side coupling element with a second bottom plate part and a second side plate part connected to each other, the second bottom plate part extends from the second side plate part, the second bottom plate part is provided for coupling with a wall fan, and the second side plate part and the first side plate part are connected by sleeving with each other.

5 Claims, 10 Drawing Sheets

WALL FAN SUSPENSION STRUCTURE

BACKGROUND OF THE INVENTION

Field of Invention

The invention relates to a wall fan, and more particularly relates to a hanging structure of a wall fan.

Description of Related Art

In order to facilitate the use of fan, effectively save the space for installing a fan, and increase the distance and range covered by the wind current produced by rotation of the fan blades, most fan users will choose to install the fan on a wall, thereby being capable of saving space without having to provide other space for placing the fan.

Please refer to FIGS. 1 and 2 for a conventional wall fan suspension structure. The conventional wall fan suspension structure comprises a wall-side coupling part 70 and a fan-side coupling part 80. The wall-side coupling part 70 is fixed and locked on a wall W, an insertion hook 71 is formed at a middle of the wall-side coupling part 70, and the fan-side coupling part 80 is fixedly coupled to a wall fan Q. The fan-side coupling part 80 has a protruding unit 81, and an insertion gap 82 is formed between the protruding unit 81 and the wall fan Q. When a user wants to hang the wall fan Q on the wall W, the user only needs to pick up the wall fan Q and align the insertion gap 82 with the insertion hook 71 and make sure that the insertion hook 71 is inserted into the insertion gap 82, so that the wall-side coupling part 70 bears a weight of the wall fan Q, and the process of hanging the wall fan Q is completed.

However, the aforementioned conventional wall fan suspension structure is extremely inconvenient when actually being used to hang the wall fan Q, the reason is that the insertion gap 82 is very narrow, and when the user aligns the insertion gap 82 with the insertion hook 71, it often takes a certain amount of time to be able to align the insertion gap 82 with the insertion hook 71. Moreover, with the wall fan Q having a certain weight, it is even more difficult for users with less strength to align the insertion gap 82 with the insertion hook 71, and therefore, a wall fan suspension structure that is convenient for assembly is required.

SUMMARY OF THE INVENTION

The invention provides a wall fan suspension structure, and a main object of the invention is to make assembly convenient for users.

In order to achieve the aforementioned object, the wall fan suspension structure of the invention comprises:

a wall-side coupling element with a first bottom plate part and a first side plate part connected to each other, the first side plate part extends from the first bottom plate part, and the first bottom plate part is provided for fixing on a wall surface; and a fan-side coupling element with a second bottom plate part and a second side plate part connected to each other, the second side plate part extends from the second bottom plate part, the second bottom plate part is provided for coupling with a wall fan, and the second side plate part and the first side plate part are connected by sleeving with each other.

Based on the foregoing, it can be known that the invention mainly connects the second side plate part with the first side plate part by sleeving with each other, so that the wall-side coupling element and the fan-side coupling element can be coupled with each other in order to achieve the object of making assembly convenient for users.

DETAILED DESCRIPTION OF THE INVENTION

Figure 1:
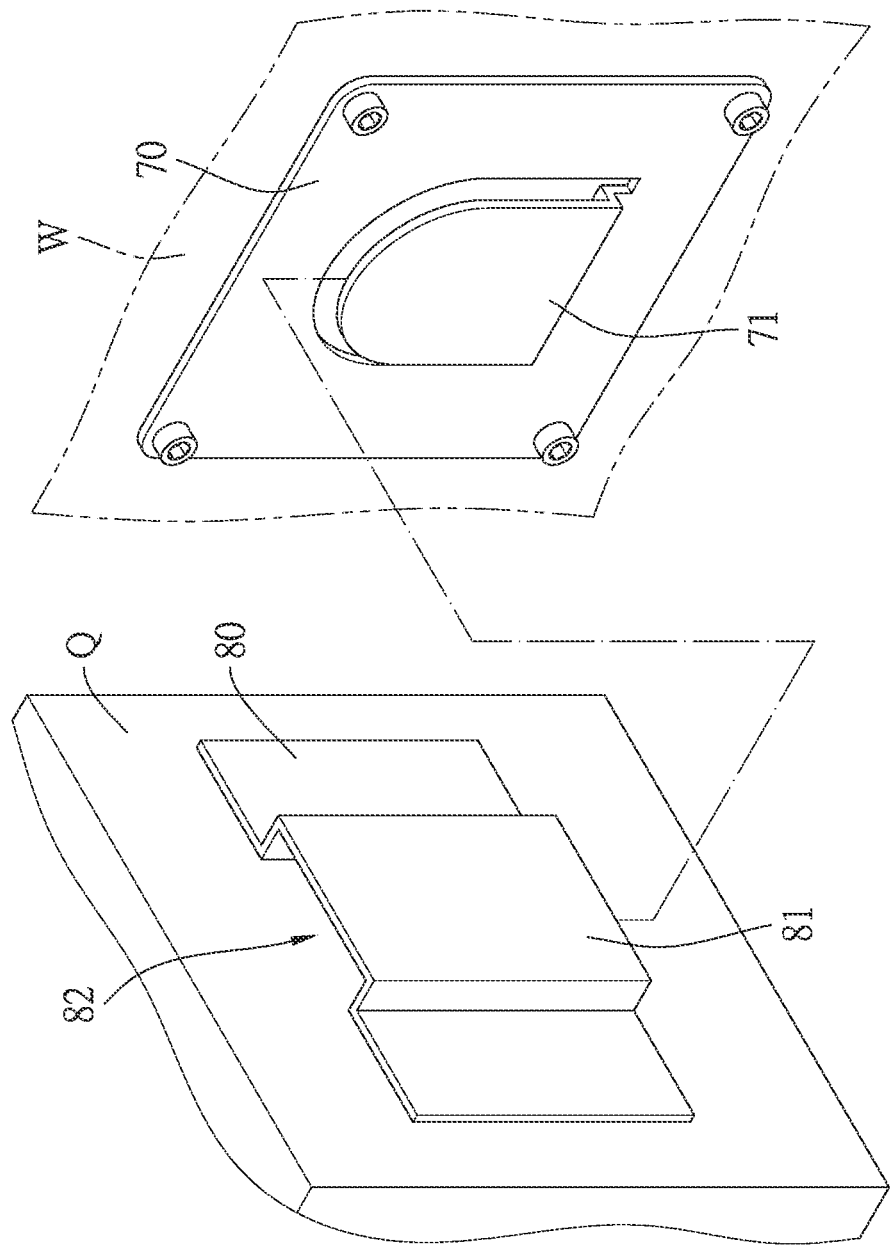
FIG. 1 is a schematic diagram of a conventional wall fan suspension structure.
Figure 2:
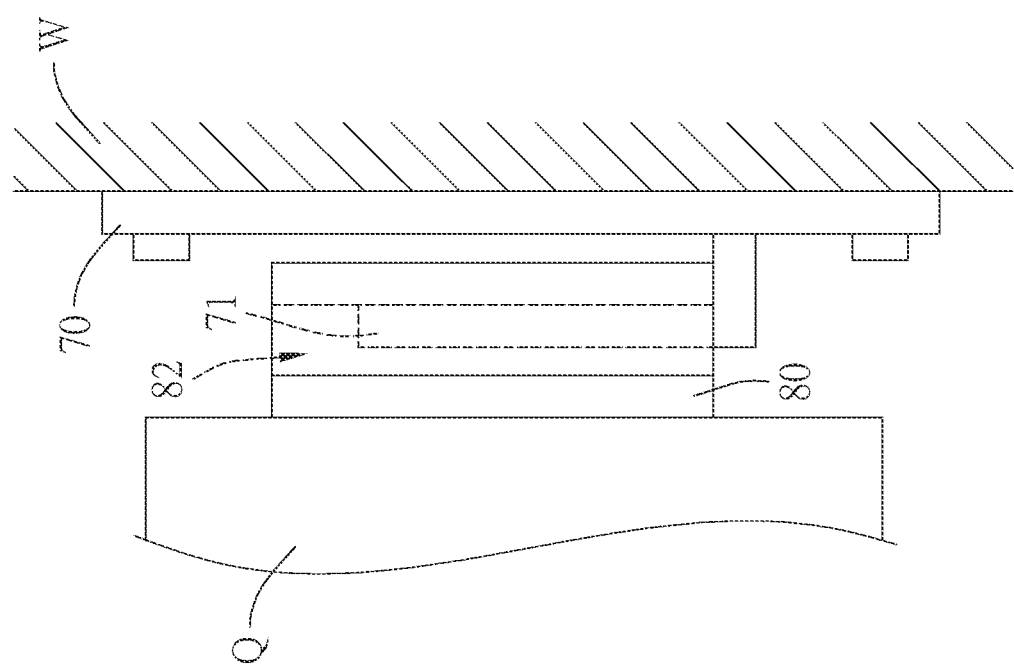
FIG. 2 is a side view of the conventional wall fan suspension structure.

The invention provides a wall fan suspension structure. Please refer to FIGS. 3A to 8 for this embodiment, the wall fan suspension structure mainly comprises a wall-side coupling element 10 and a fan-side coupling element 20.

The wall-side coupling element 10 has a first bottom plate part 11 and a first side plate part 12 that are connected to each other, the first side plate part 12 extends from the first bottom plate part 11, and extending directions of the first side plate part 12 and the first bottom plate part 11 are generally perpendicular to each other, so that there is a first included angle $\theta1$ between the first side plate part 12 and the first bottom plate part 11 which is close to 90 degrees. The first bottom plate part 11 is provided for locking on a wall surface A, the first side plate part 12 has at least one first locking hole 121 and at least one first hanging hole 122, shapes of the first locking hole 121 and the first hanging hole 122 are not limited, and the first side plate part 12 is defined with a first inner diameter D1. In this embodiment, the first bottom plate part 11 is a circular metal plate body, the first bottom plate part 11 defines a radial direction R, the first side plate part 12 extends from an outer periphery of the first bottom plate part 11, the first side plate part 12 is an annular metal plate body, the first inner diameter D1 is a diameter length of a circle surrounded by the first side plate part 12, and the first inner diameter D1 extends along the radial direction R, but is not limited thereto. A shape of the first bottom plate part 11 can also be square or polygonal, a shape of the first side plate part 12 changes with the shape of the first bottom plate part 11, for example, when the shape of the first bottom plate part 11 is square, the first side plate part 12 has a square ring shape, and the first inner diameter D1 is a side length of the square ring-shaped metal plate body.

The fan-side coupling element 20 is sleeved with the wall-side coupling element 10. The fan-side coupling element 20 has a second bottom plate part 21 and a second side plate part 22 that are connected to each other, the second side plate part 22 extends from the second bottom plate part 21, there is a second included angle θ2 between the second side plate part 22 and the second bottom plate part 21, the second side plate part 22 and the first side plate part 12 are connected by sleeving with each other, and the second side plate part 22 can be sleeved outside the first side plate part 12 or the first side plate part 12 can be sleeved outside the second side plate part 22. The second side plate part 22 is defined with a second inner diameter D2, when the second inner diameter D2 is greater than the first inner diameter D1, the second side plate part 22 is sleeved outside the first side plate part 12, and when the second inner diameter D2 is smaller than the first inner diameter D1, the first side plate part 12 is sleeved outside the second side plate part 22. The second bottom plate part 21 is provided for coupling with a wall fan F. In this embodiment, the second bottom plate part 21 is a circular metal plate body, the second side plate part 22 extends from an outer periphery of the second bottom plate part 21, the second side plate part 22 is an annular metal plate body, the second side plate part 22 has at least one second locking hole 221 and at least one second hanging hole 223, and shapes of the second locking hole 221 and the second hanging hole 223 are not limited. When the fan-side coupling element 20 and the wall-side coupling element 10 are sleeved with each other, positions of the second locking hole 221 and the first locking hole 121 correspond to each other, the second inner diameter D2 is a diameter length of a circle surrounded by the second side plate part 22, and the second inner diameter D2 extends along the radial direction R, but is not limited thereto. Please refer to FIG. 8, a shape of the second bottom plate part 21 can also be square or polygonal, and a shape of the second side plate part 22 can change with the shape of the second bottom plate part 21, for example, when the shape of the second bottom plate part 21 is square, the second side plate part 22 has a square ring shape, and the second inner diameter D2 is a side length of the square ring-shaped metal plate body.

At least one locking unit 30 is inserted into the first locking hole 121 and the second locking hole 221, and the locking unit 30 extends along the radial direction R so that the first side plate part 12 and the second side plate part 22 are tightly combined with each other. A quantity of the locking unit 30 is the same as a quantity of the first locking hole 121 and the second locking hole 221, and the locking unit 30 can be a combination of a bolt and a nut, or a rivet, but is not limited thereto.

In one preferred embodiment, there is at least one fixing unit 40 inserting into the first hanging hole 122 and the second hanging hole 223. The fixing unit 40 can be a combination of a bolt and a nut, or a rivet, but is not limited thereto. Please refer to FIGS. 6A to 6C for this embodiment, when assembling the wall-side coupling element 10 with the fan-side coupling element 20, first, the first hanging hole 122 and the second hanging hole 223 are aligned with each other, and the fixing unit 40 is inserted and fixed into the first hanging hole 122 and the second hanging hole 223 to facilitate alignment of the first locking hole 121 with the second locking hole 221 in order to facilitate subsequent fixing operation of the locking unit 30.

Figure 3A:
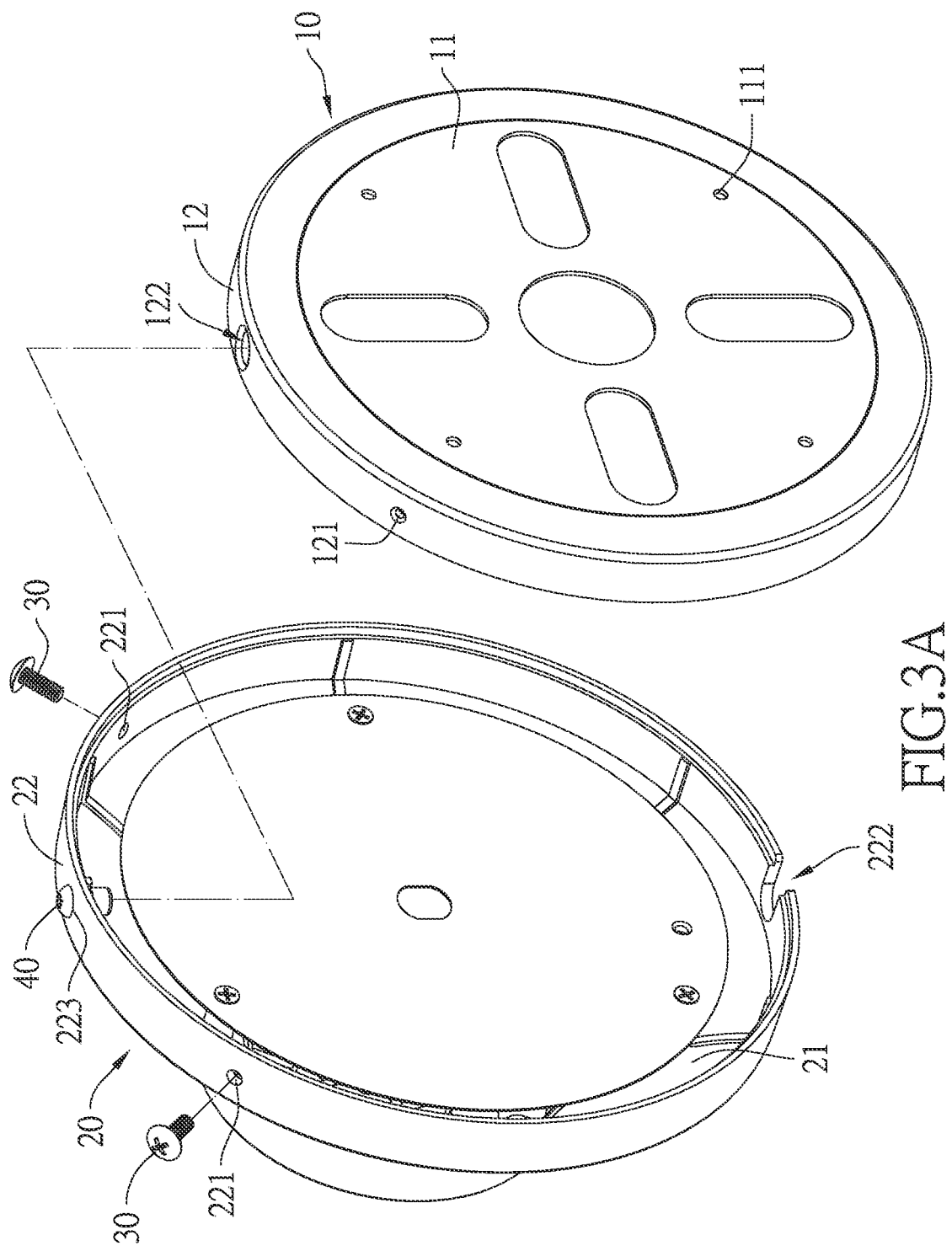
FIG. 3A is an exploded view of a wall fan suspension structure of the invention.
Figure 3B:
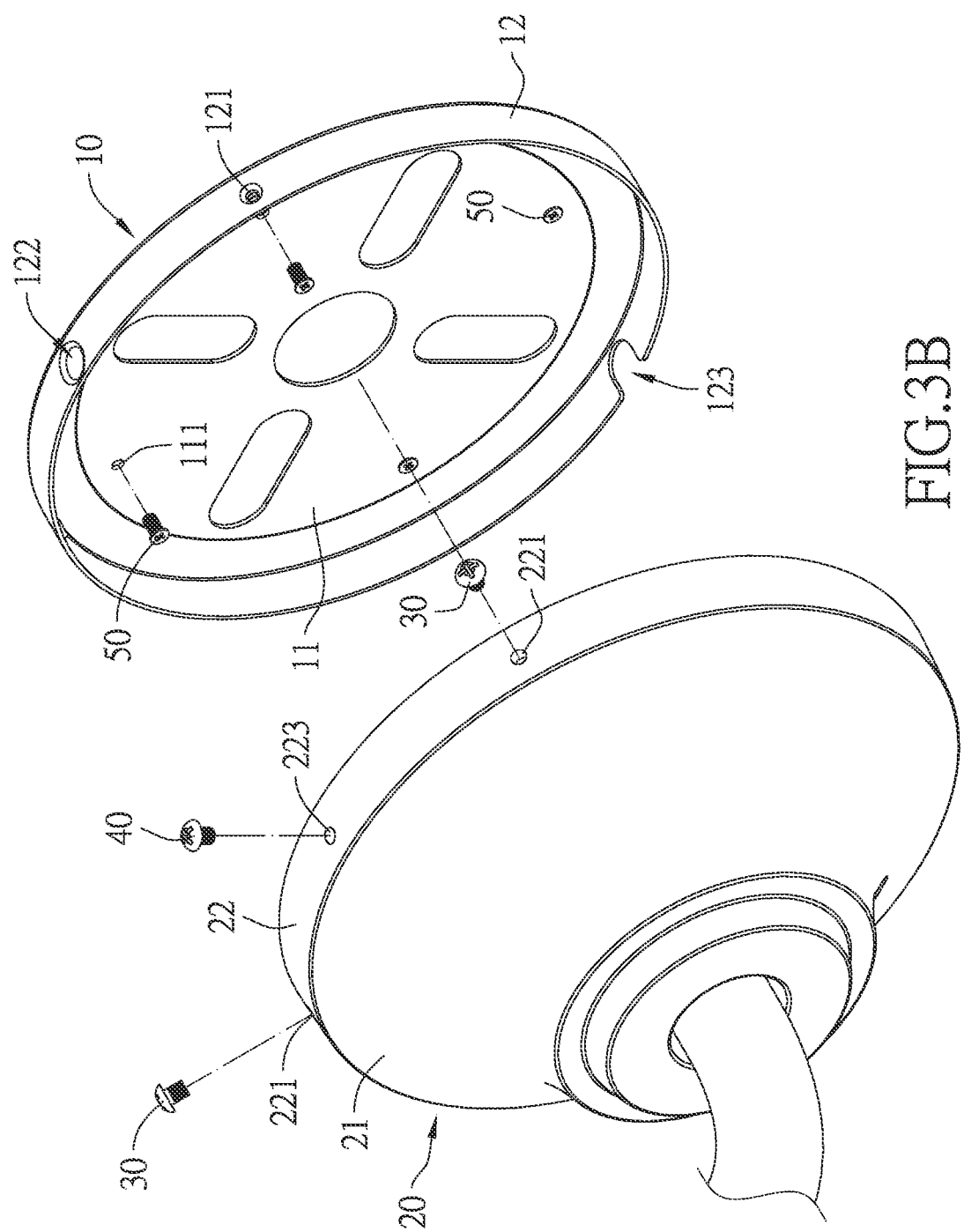
FIG. 3B is an exploded view of a wall fan suspension structure of the invention.
Figure 4:
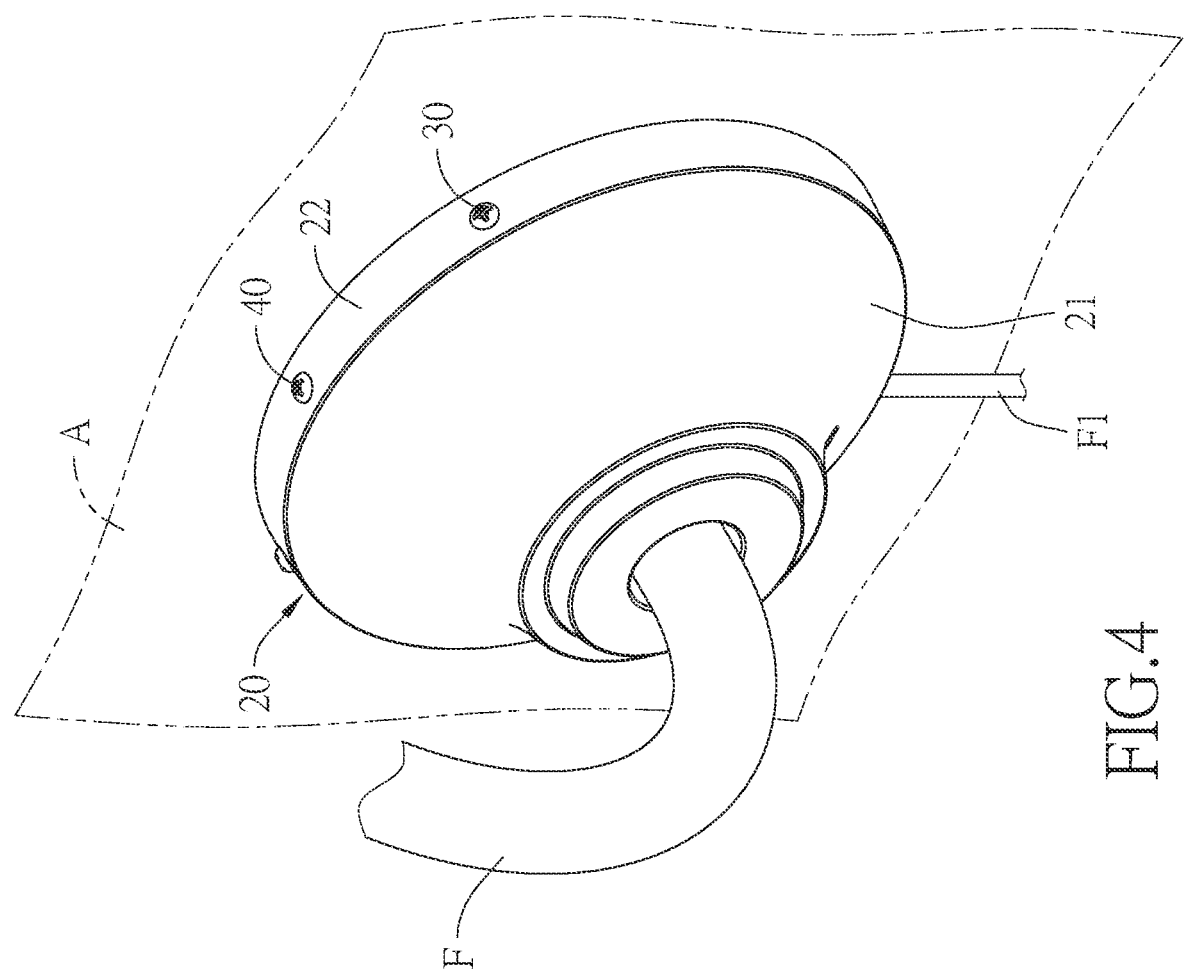
FIG. 4 is a schematic diagram of the combined wall fan suspension structure of the invention.
Figure 5:
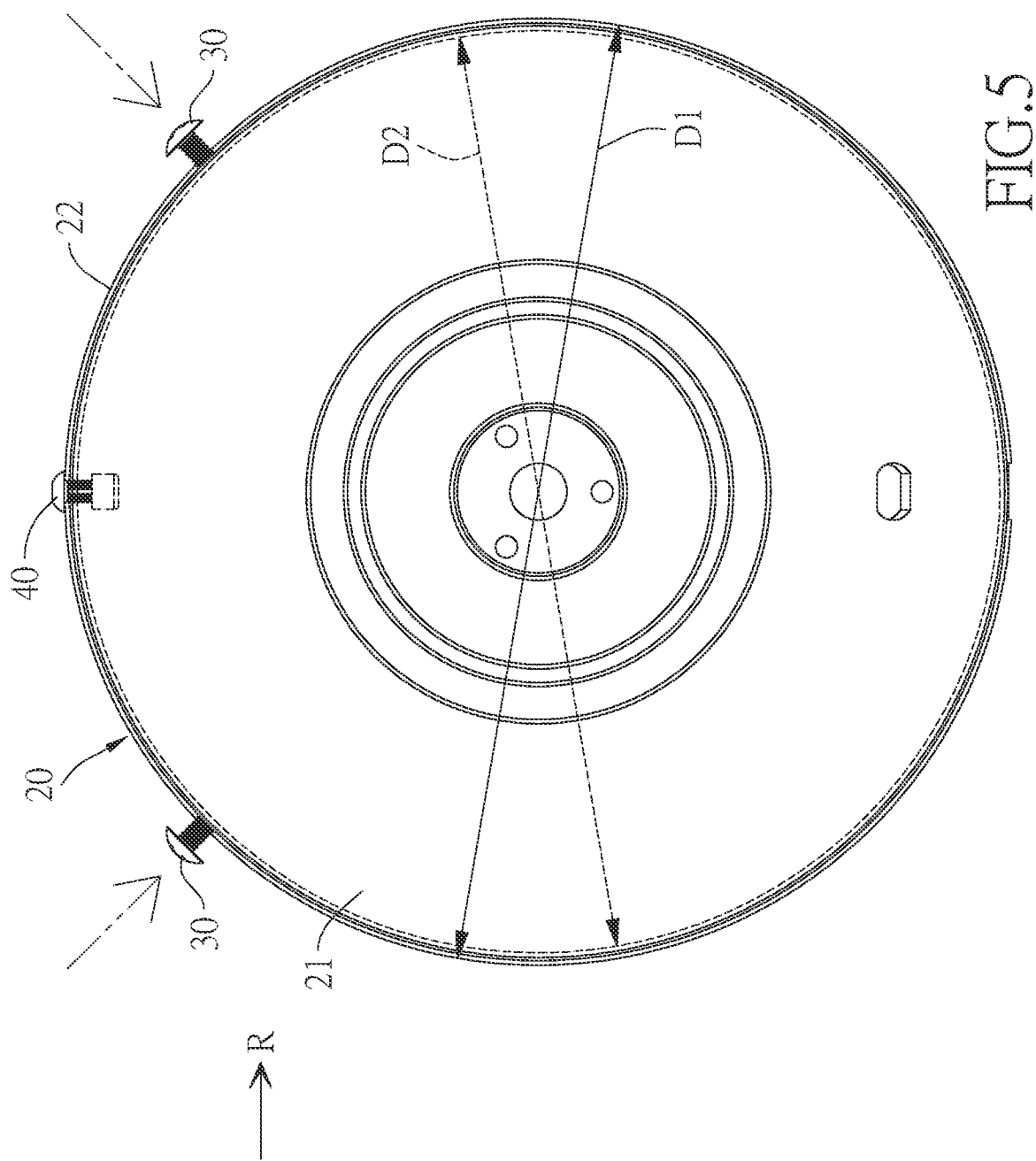
FIG. 5 is a cross-sectional view of the wall fan suspension structure of the invention.
Figure 6A:
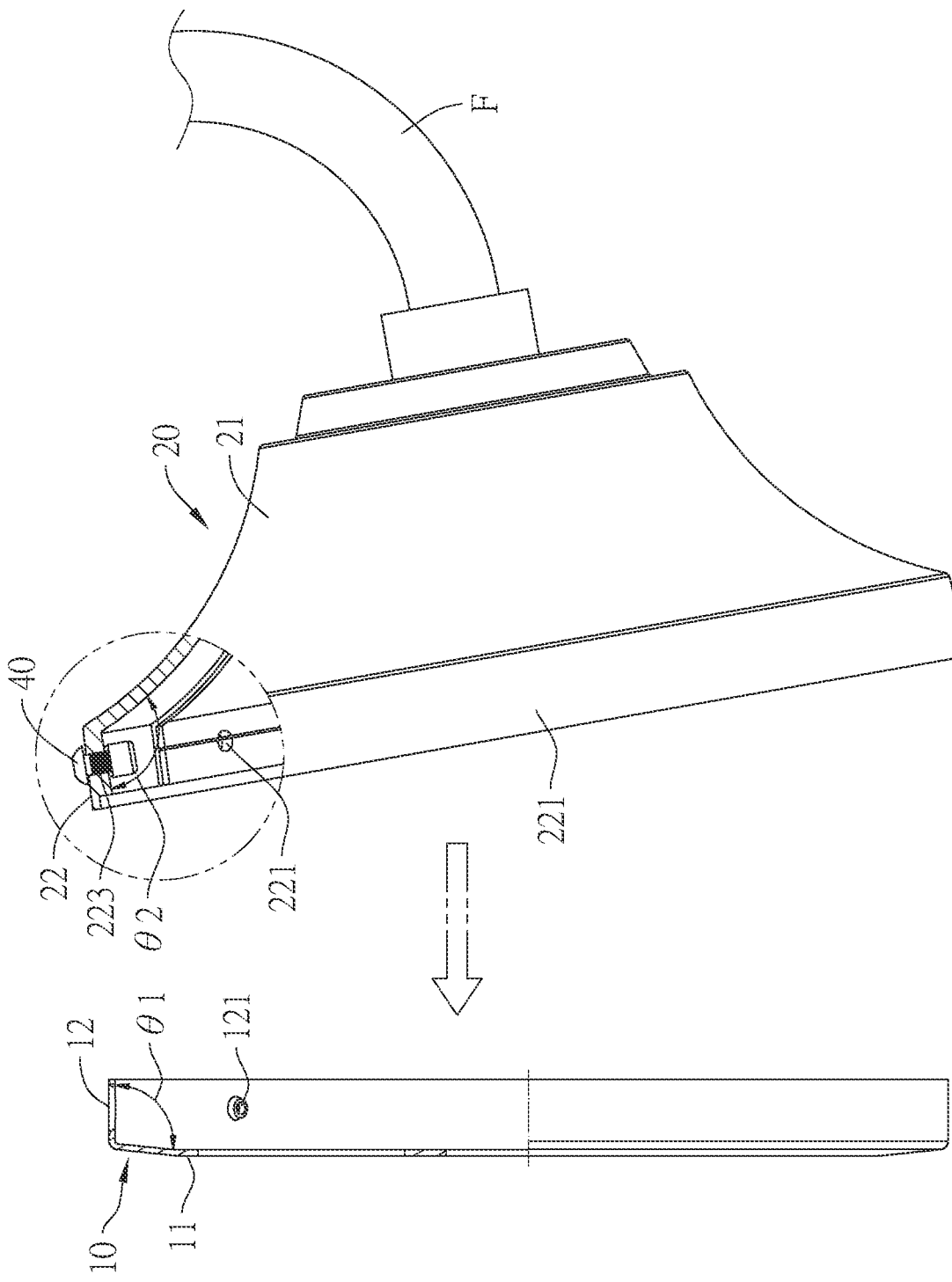
FIG. 6A is a schematic diagram of combination of the wall fan suspension structure of the invention.
Figure 6C:
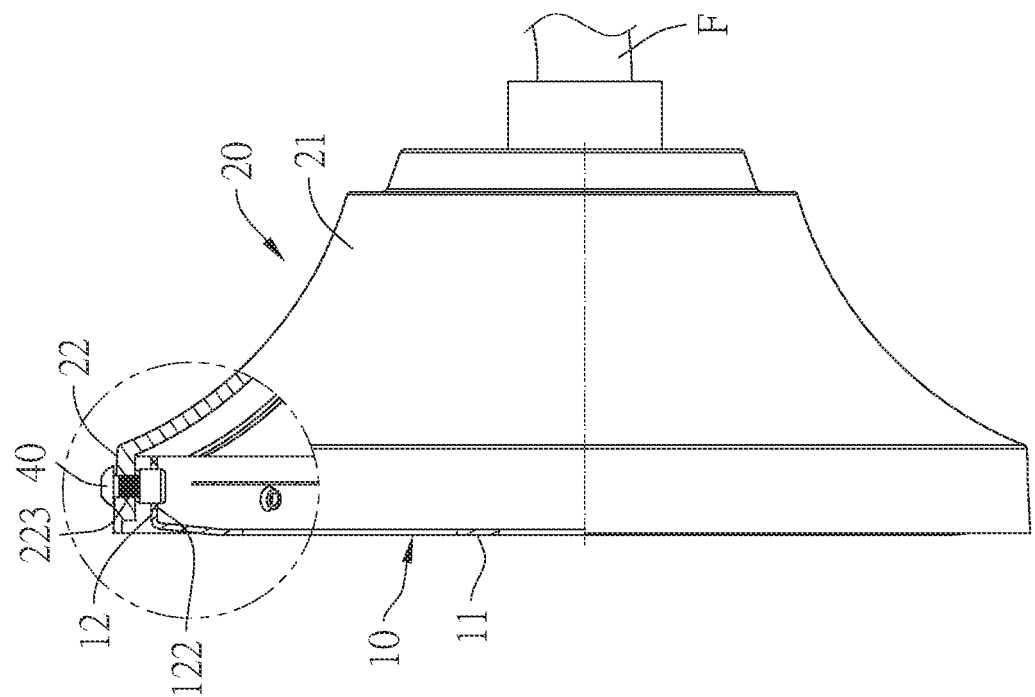
FIG. 6C is a schematic diagram of combination of the wall fan suspension structure of the invention.
Figure 6B:
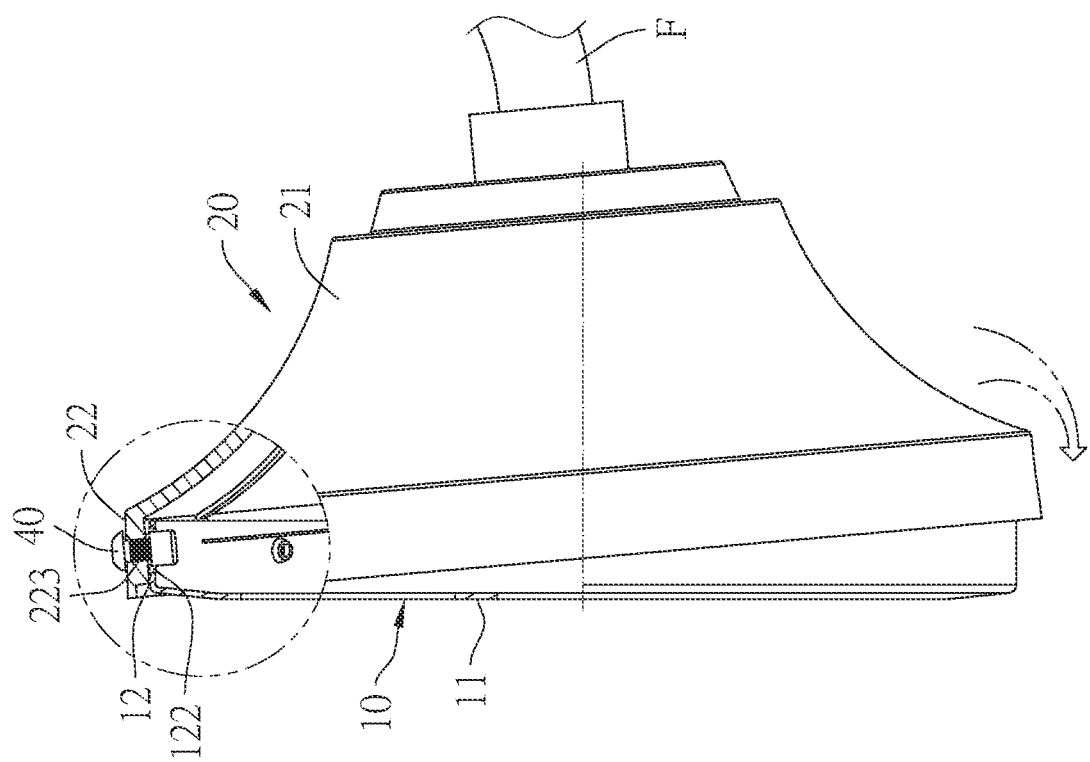
FIG. 6B is a schematic diagram of combination of the wall fan suspension structure of the invention.

In one preferred embodiment, referring to FIG. 3, the second side plate part 22 has a main opening 222, and the main opening 222 is provided for an electric wire F1 of the wall fan F to pass through.

Preferably, the first side plate part 12 has an aligned opening 123, the aligned opening 123 faces the main opening 222, the aligned opening 123 and the main opening 222 jointly form a threading hole (not shown in the figures), and the threading hole is provided for the electric wire F1 of the wall fan F to pass through.

In one preferred embodiment, the first bottom plate part 11 of the wall-side coupling element 10 has a plurality of penetrated through holes 111, and a plurality of screws 50 locked in the through holes 111 and penetrated into a wall surface to fixedly couple the wall-side coupling element 10 to a wall.

Figure 7:
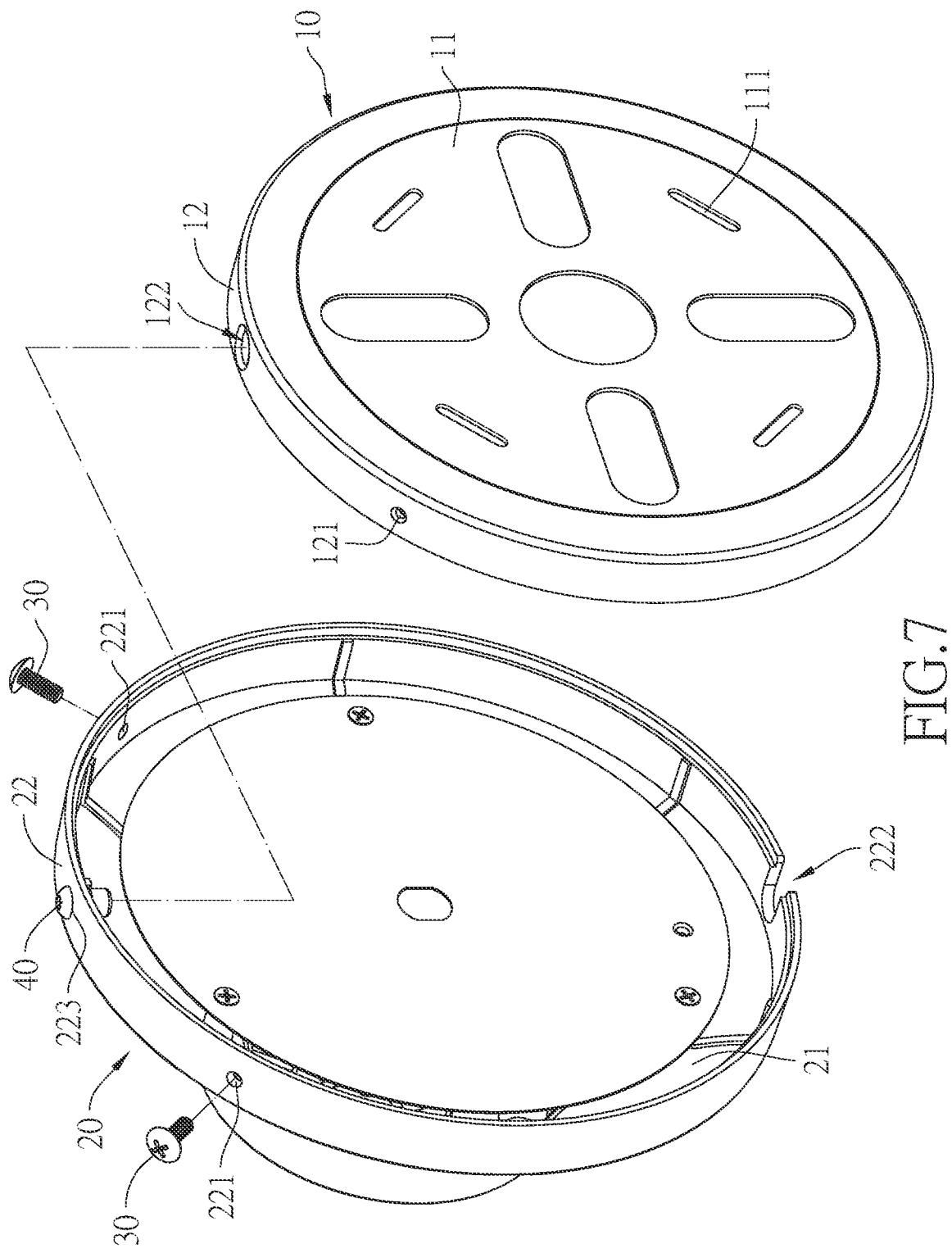
FIG. 7 is an exploded view of the wall fan suspension structure according to a preferred embodiment of the invention.
Figure 8:
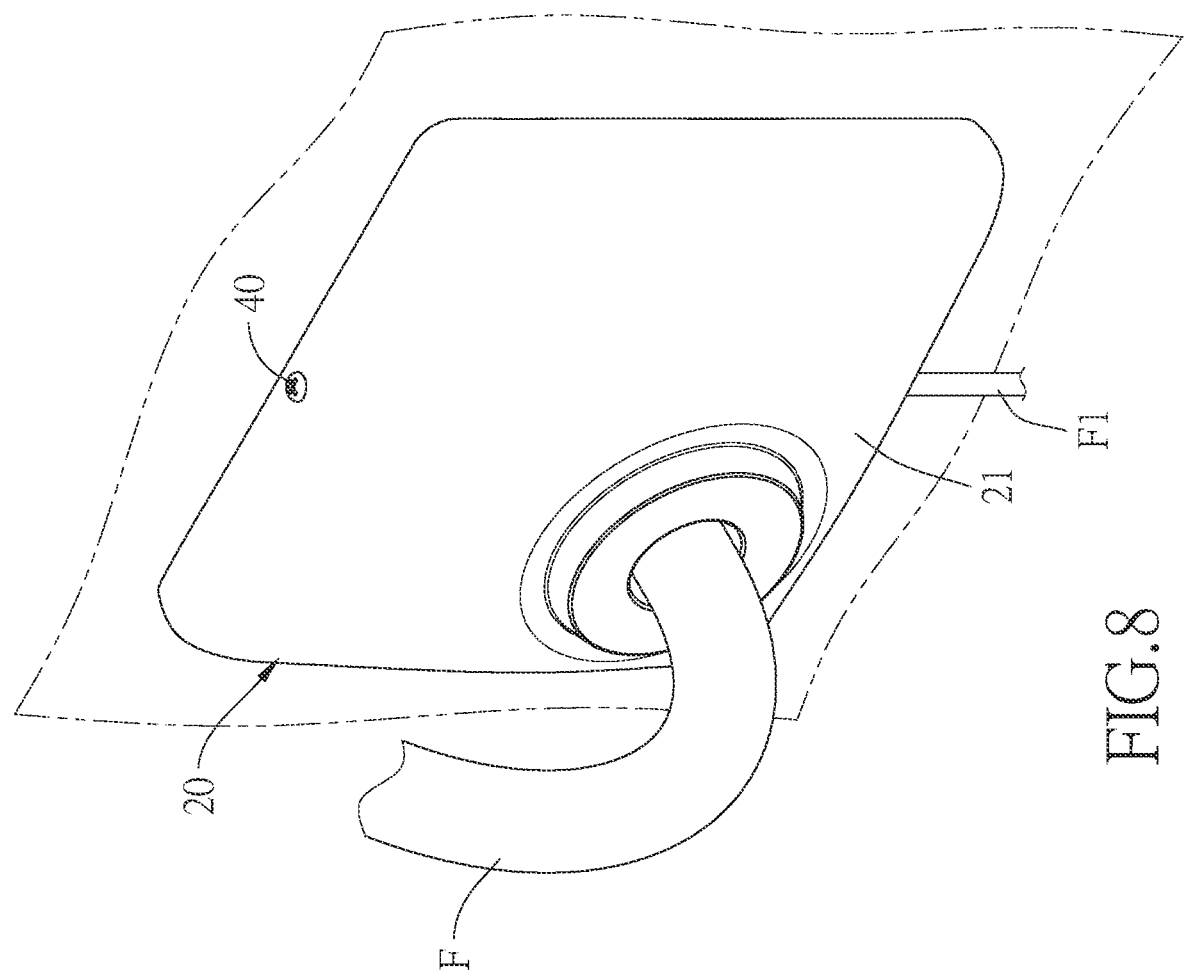
FIG. 8 is a schematic diagram of the wall fan suspension structure according to a preferred embodiment of the invention.

Preferably, referring to FIG. 7, the above-mentioned through holes 111 are elongated holes. When a user wants to fine-adjust a height of the wall-side coupling element 10, a position of the wall-side coupling element 10 can be adjusted by loosening the screws 50, thereby an objective of fine-adjusting the wall fan suspension structure is achieved.

Based on the foregoing, it can be known that the invention mainly connects the second side plate part 22 with the first side plate part 12 by sleeving with each other, so that the wall-side coupling element 10 and the fan-side coupling element 20 can be coupled with each other in order to achieve an object of making assembly convenient for users.

In summary, the invention is capable of effectively solving the drawbacks of the prior art, and can be easily understood and implemented by those having ordinary skill in the art to which the invention pertains. However, the above description is only the preferred embodiments of the invention, and should be construed as exemplary rather than as limitative of the invention, with many variations and modifications being readily attainable by a person of average skill in the art without departing from the spirit or scope thereof as defined by the appended claims and their legal equivalents.

What is claimed is:

1. A wall fan suspension structure comprising:
a wall-side coupling element with a first bottom plate part and a first side plate part connected to each other, the first side plate part extending from the first bottom plate part, and the first bottom plate part being provided for fixing on a wall surface; and
a fan-side coupling element with a second bottom plate part and a second side plate part connected to each other, the second side plate part extending from the second bottom plate part, the second bottom plate part being provided for coupling with a wall fan, and the second side plate part and the first side plate part being connected by sleeving with each other;
the first side plate part has at least one first locking hole, the second side plate part has at least one second locking hole, when the second side plate part and the first side plate part are sleeved with each other, positions of the second locking hole and the first locking hole are aligned with each other, and there is at least one locking unit inserting into the first locking hole and the second locking hole so that the first side plate part and the second side plate part are tightly combined with each other; and
the first side plate part has at least one first hanging hole, the second side plate part has at least one second hanging hole, and there is at least one fixing unit inserting into the first hanging hole and the second hanging hole.

2. The wall fan suspension structure as claimed in claim 1, wherein the first side plate part is defined with a first inner diameter, the second side plate part is defined with a second inner diameter, when the second inner diameter is greater than the first inner diameter, the second side plate part is sleeved outside the first side plate part, and when the second inner diameter is smaller than the first inner diameter, the first side plate part is sleeved outside the second side plate part.

3. The wall fan suspension structure as claimed in claim 1, wherein the second side plate part has a second main opening, and the second main opening is provided for an electric wire to pass through.

4. The wall fan suspension structure as claimed in claim 1, wherein the first bottom plate part has a plurality of penetrated through holes, and a plurality of screws locked in the through holes.

5. The wall fan suspension structure as claimed in claim 3, wherein the through holes are elongated holes.

* * * * *